Figure 4:
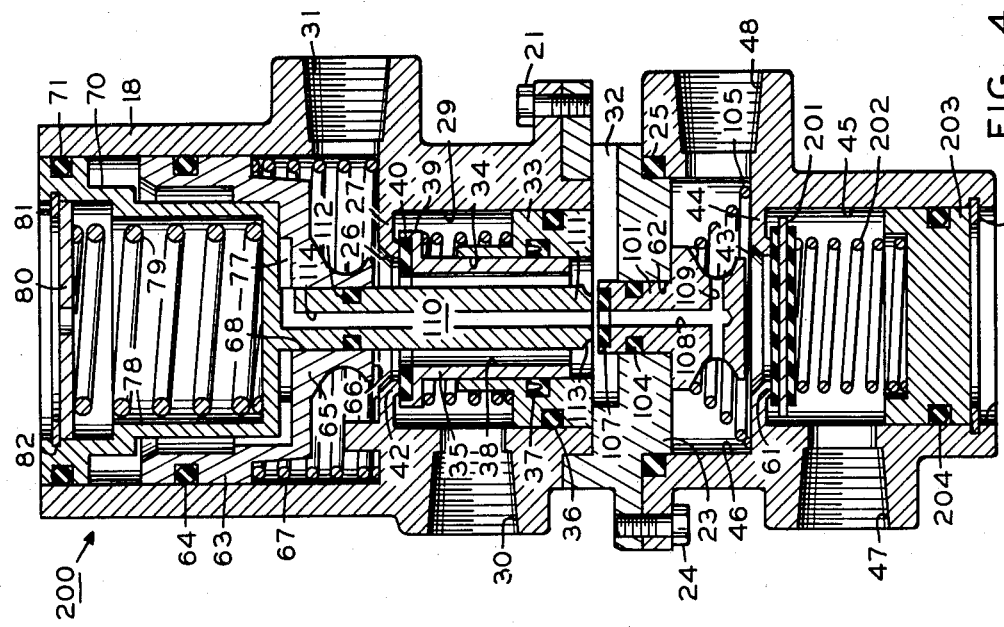

June 23, 1964     R. C. BUELER     3,138,411
CONTROL VALVE
Filed Feb. 4, 1963                       2 Sheets-Sheet 1
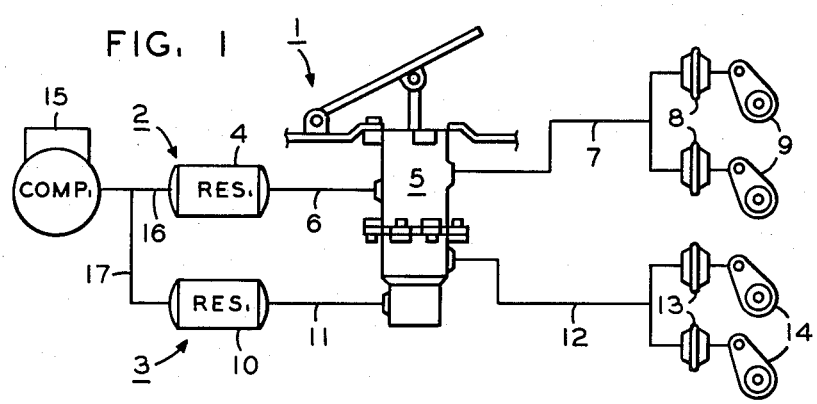
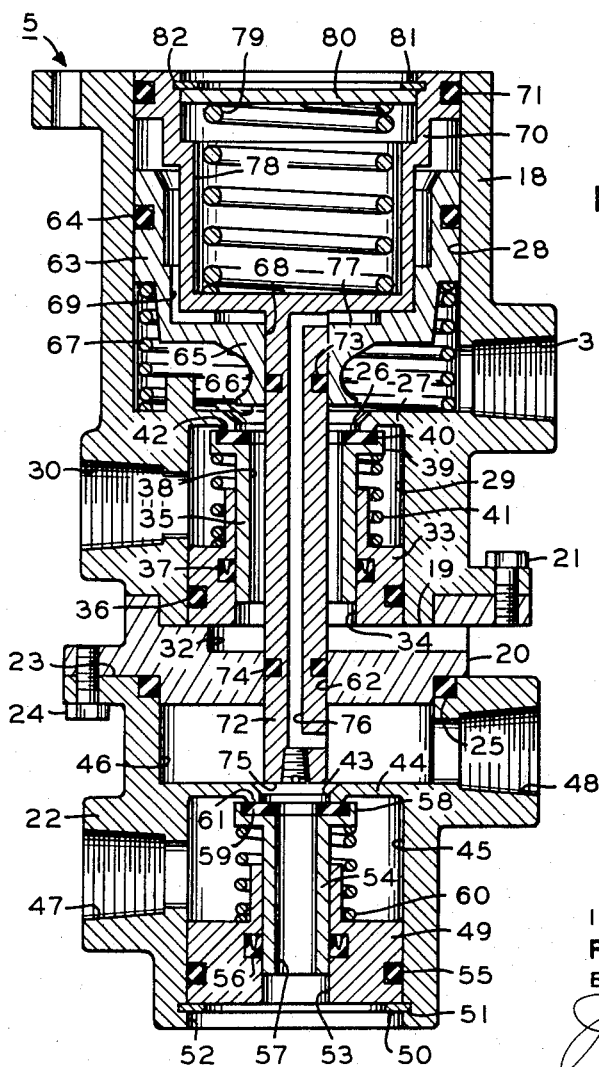
INVENTOR
RICHARD C. BUELER
BY
*Joseph E. Papin*

INVENTOR
RICHARD C. BUELER
BY
Joseph E. Papin

United States Patent Office 3,138,411
Patented June 23, 1964

3,138,411
CONTROL VALVE
Richard C. Bueler, Glendale, Mo., assignor to Wagner Electric Corporation, St. Louis, Mo., a corporation of Delaware
Filed Feb. 4, 1963, Ser. No. 255,944
26 Claims. (Cl. 303—52)

The invention relates to control valves and in particular to tandem type control valves for controlling separate fluid pressure systems.

In past tandem control valves, the separate valving therein for controlling pressure fluid flow in the separate systems was actuated by separate valve control or reaction means which were connected by yoke type linkage or the like to an operator pedal or treadle. One of the undesirable features of the past tandem control valves was that the reaction forces which provide or "feel" as to the extent of the braking effort were each transmitted to the operator through the linkage from the reaction means. Another undesirable feature was that the "feel" varied upon failure of fluid pressure in one of the separate systems effecting variation in controllability which tended to confuse the operator. Another undesirable feature was that an appreciable lost stroke in the operator treadle also accompanied the failure of fluid pressure in one of the separate systems. Still another undesirable feature was that the control of the separate systems could not be sequenced, i.e., one system actuated slightly before the other system to reduce the tendency of front wheel skid on slippery pavements. And still another undesirable feature was the requirement of an intermediate yoke-type connecting linkage between the separate reaction means and the operator treadle.

It is the object of the present invention to provide a control valve which overcomes the aforementioned undesirable and objectional features, and this and other objects and advantages will become apparent hereinafter.

Briefly, the invention embodies a control valve mechanism having a pair of control means therein for controlling the application of fluid pressure from a pair of fluid pressure sources to a pair of fluid pressure responsive servo motors and having an expansible chamber between said control means. One of the control means is movable to apply fluid pressure from one of the sources to one of the servo motors and includes means for passing the applied fluid pressure into the expansible chamber, and the other of the control means is responsive to fluid pressure in said expansible chamber to apply fluid pressure from the other of the sources to the other of the servo motors.

Figure 3:
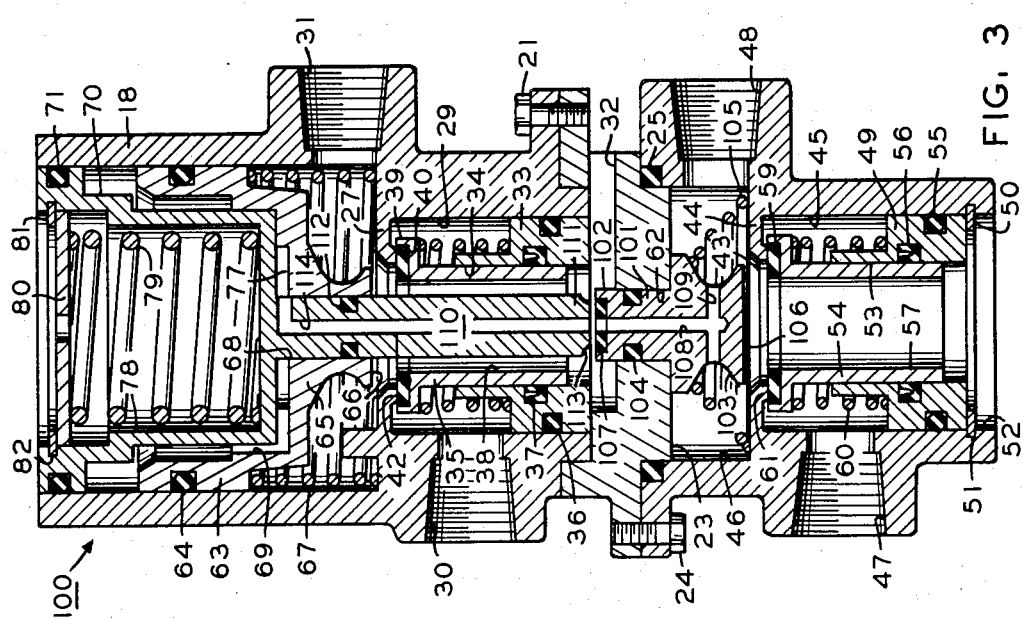

The invention also consists in the parts and arrangement of parts hereinafter described and claimed. In the accompanying drawings which form a part of the specification and wherein like numerals refer to like parts wherever they occur:

FIG. 1 is a diagrammatic view of a fluid pressure system showing a control valve embodying the present invention therein, FIG. 2 is a greatly enlarged cross-sectional view of the control valve shown in FIG. 1, and FIGS. 3 and 4 are cross-sectional views of other control valves embodying the present invention.

Referring now to FIG. 1, a dual brake actuating system 1 is shown having separate fluid pressure branches, indicated generally at 2 and 3. The branch 2 includes a reservoir 4 for fluid pressure storage which is connected to one of a pair of separate inlet ports of a treadle actuated tandem control valve 5 by conduit 6. The tandem control valve 5 is also provided with a pair of separate outlet ports, and a service line or conduit 7 connects one of said outlet ports with a set of brake chambers 8 which are linked with slack adjusters 9 to control the energization of an axle set of vehicle brake assemblies (not shown). The branch 3 includes a reservoir 10 for fluid pressure storage which is connected to the other of the inlet ports of the control valve 5 by a conduit 11 and another service line or conduit 12 connects the other of the outlet ports of said control valve with another set of brake chambers 13 which are linked with slack adjusters 14 to control the energization to another set of vehicle brake assemblies (not shown). To complete the system 1, a compressor 15 is connected with the reservoir 4 by conduit 16, and another conduit 17 branching therefrom connects with the reservoir 10, said compressor and separate reservoir forming in combination separate fluid pressure sources.

The tandem control valve 5 is provided with an upper housing 18 which is connected to an upper end portion 19 of an intermediate housing or separation plate 20 by suitable means, such as a plurality of studs 21. A lower housing 22 is sealably connected with a lower end portion 23 of the intermediate housing 20 by suitable means, such as a plurality of studs 24, and a seal ring 25 is sealably interposed between said sealing ring and housing.

The upper housing 18 is provided with a bore 26 defining an annular wall 27 axially positioned between an upper counterbore 28 and a lower counterbore 29 forming a set of outlet and inlet chambers, respectively. An inlet port 30 which receives the conduit 6, as previously mentioned, is provided in the upper housing 18 connecting with the counterbore 29, and an outlet port 31 which receives the service line 7, as previously mentioned, is provided in said upper housing connecting with the counterbore 28.

A recess 32 is provided in the upper portion 19 of the intermediate housing 20 beneath the counterbore 29 forming an exhaust chamber or port. A valve guide member 33 is received in the lower end of the counterbore 29 and is normally seated on the upper end 19 of the intermediate housing 20. The valve guide member 33 is provided with a bore 34 in which an inlet valve element 35 is slidable and seals 36 and 37 are carried by said valve guide member in sealing engagement with counterbore 29 and said valve element, respectively. The inlet valve element 35 is provided with an exhaust bore or opening 38 and has an enlarged sealing head 39 including an annular resilient seal or disc 40. A valve spring 41 is provided between the valve guide member 33 and the sealing head 39 and normally urges the valve seal 40 into sealing engagement with valve seat 42 which is formed on the wall 27 at the juncture of the bore 26 and counterbore 29.

The lower housing 22 is provided with a bore 43 defining an annular wall 44 axially positioned between counterbores 45 and 46 which form another pair of inlet and outlet chambers, respectively. Another inlet port 47 which receives the conduit 11, as previously mentioned, is provided in the lower housing 22 connecting with the counterbore 45, and another outlet or working port 48 which receives the service line 12, as previously mentioned, is connected with the counterbore 46. Another valve guide member 49 is positioned against displacement in the counterbore 45 by a snap ring 50 received in a groove 51 adjacent the lower end of said counterbore, and the lower end of said counterbore forms an exhaust port 52. The valve guide member 49 is provided with a bore 53 in which another inlet valve element 54 is slidable and seals 55 and 56 are carried by said valve guide in sealing engagement with the counterbore 45 and said inlet valve element, respectively. The inlet valve element 54 is provided with an axial bore or exhaust opening 57 and has an enlarged seal head 58 on the upper end thereof, the sealing head including an annular resilient seal or disc 59. A valve spring 60 is provided between the valve guide 49 and the sealing head 58 and normally urges the valve seal 59 into sealing engagement with a valve seat 61 which is formed on the wall 44 at the juncture of the bore 43 and the counterbore 45. The intermediate housing 20 is provided with a centrally located bore 62 which is axially aligned with the bores 26 and 43 in the upper and lower housings 18 and 22, respectively.

A relay piston or valve control element 63 is slidably received in the counterbore 28, and a seal 64 is carried by said relay piston in sealing engagement with said counterbore. The relay piston 63 is provided with an integral extension 65 having a valve seat 66 in the lower end thereof which is coaxial with the bore 26 and is normally maintained in spaced relation with the valve seal 40 of the valve head 39 by return spring 67. A bore 68 is provided through the relay piston extension 65 and connects with an aligned counterbore 69 provided in said relay piston. A reaction piston or valve control element 70 is also slidably received in the counterbore 28, and a seal 71 is carried by said reaction piston in sealing engagement with said counterbore. The reaction piston 70 extends coaxially into the counterbore 69 of the relay piston 63 and normally abuts the shoulder provided between the counterbore 69 and bore 68 of said relay piston. The reaction piston 70 is provided with an extension or stem portion 72 which extends coaxially downwardly through the relay piston bore 68, the exhaust opening 38 of the inlet valve 35, the bore 62 of the intermediate housing 20 into the counterbore 46 of the lower housing 22. The extension 72 is slidably received in the relay piston bore 68 and the intermediate housing bore 62, and seals 73 and 74 are carried on said extension in sealing engagement with said relay piston bore and intermediate housing bore. A valve seat 75 is formed on the free end of the extension 72 in the counterbore 46 for engagement with the sealing disc 59 of the valve 54, and a passage 76 is provided in said extension 73 having one end in open pressure fluid communication with the counterbore 46 and the other end thereof in open pressure communication with an expansible chamber 77 formed in the counterbore 28 of the upper housing 18 between the relay piston 63 and the reaction piston 70. The reaction piston 70 is also provided with a reaction spring bore 78 in the upper end thereof, and a precompressed reaction spring 79 is retained therein against displacement by a force receiving plate 80 and snap ring 81 which is positioned in a groove 82 provided adjacent the upper end of said reaction spring bore.

In the operation, a manually applied force by the operator through the foot treadle onto the force receiving plate 80 of the reaction piston 70 moves said reaction piston and the relay piston 63 downwardly against the negligible force of the return spring 67 to engage the valve seat 75 on the free end of the extension 72 with the valve seat 61 of the inlet valve 54 closing the exhaust passage 57 and isolating the outlet chamber 46 from the atmosphere. Further downward movement of the reaction piston 70 disengages the inlet valve 54 from the seat 61 on the wall 44 to establish pressure fluid communication between the inlet and outlet ports 47 and 48. The initial concert movement of the pistons 63 and 70 moves the valve seat 66 on the piston 63 to an advanced position either juxtaposed with the valve 35 or in lapped engagement therewith. The pressure fluid flows from the reservoir 10 through the conduit 11, the inlet port 47, the inlet chamber 45 and the passage or bore 43 into the outlet or working chamber 46 and therefrom into the service line 12 to actuate the brake chamber 13 and rotate slack adjusters 14 to energize the axle set of wheel brake assemblies associated therewith. At the same time, the pressure fluid so admitted into the outlet chamber 46 also flows therefrom through the passage 76 in the extension 72 into the expansible chamber 77 between the relay and reaction pistons 63 and 70. The fluid pressure so established in the expansible chamber 77 acts on the effective area of the relay piston 63 creating an application force to move said relay piston downwardly from the advanced position independently of the reaction piston 70. If in the advanced position the seat 66 is juxtaposed with the valve 35, the downward movement of the piston 63 engages the seat 66 with the valve seal 40 of the inlet valve 35 closing the exhaust passage 38 and isolating the outlet chamber 28 from the atmosphere. Further downward movement of the relay piston 63 disengages the inlet valve 35 from the seat 42 on the wall 27 to establish pressure fluid communication between the inlet and outlet ports 30 and 31. The pressure fluid flows from the reservoir 4 through the conduit 6, the inlet port 30, the inlet chamber 29, the passage or bore 26 and the outlet chamber 28 into the outlet port 31 and therefrom through the service line 12 to actuate the brake chambers 13 and rotate slack adjusters 14 to energize the axle set of wheel brake assemblies associated therewith. It should be noted that the inlet valve 54 is normally opened before the inlet valve 35.

When the reaction force created by the established fluid pressure in the expansible chamber 77 acting on the effective area of the reaction piston 70 equals the manually applied force, said reaction piston is moved upwardly against the compressive force of the metering spring 79 wherein the inlet valve 54 is positioned in lapped engagement with the valve seat 61 and the reaction piston valve seat 75 is positioned in lapped engagement with said inlet valve. The reaction force acting through the metering spring 79 against the manually applied force on the plate 80 affords the operator an accurate and direct "feel" as to the extent of the braking effort or application. Similarly, when the reaction force created by the established fluid pressure in the outlet chamber 28 acting on the effective area of the relay piston 63 equals the application force on said relay piston, said relay piston is also moved upwardly wherein the inlet valve 35 is positioned in lapped engagement with the valve seat 42 and the relay piston valve seat 66 is positioned in lapped engagement with said inlet valve. In the lapped position, it should be noted that the reaction force on the relay piston 63 is substantially equal and opposite to the reaction force thereon. If greater braking effort is desired, a manually applied force is increased which results in an increased application force and the component parts of the control valve 5 function in the same manner as previously described to again move said component parts to their lapped positions.

When the desired braking effort is attained, the manually applied force is removed from the reaction piston 70 wherein the fluid pressure in the expansible chamber 70 serves to move said reaction piston upwardly to its original position and the valve spring 60 returns the inlet valve 54 into sealing engagement with the valve seat 61. Initially, this upward movement re-engages the valve seal 59 with the seat 61 to again interrupt fluid pressure communication between the inlet and outlet ports 47 and 48, and further upward movement of said reaction piston disengages the valve seat 75 from the valve seal 59 to re-establish communication between the outlet port 48 and the atmosphere and de-energize the wheel brake assemblies associated therewith by exhausting pressure fluid from brake chambers 13 through the service line 12 and said outlet port, the outlet chamber 46, the inlet valve exhaust passage 57 and the exhaust port 52 in the lower housing 22. At the same time, the fluid pressure is also exhausted from the expansible chamber 77 through the passage 76 in the reaction piston extension 72 into the outlet chamber 46 and therefrom to atmosphere, as described above, to eliminate the application force on the relay piston 63. Upon the elimination of the application force, the return springs 41 and 67 move the inlet valve 35 and the relay piston 63 upwardly to their original positions. Initially this upward movement sealably re-engages the valve seal 40 with the valve seat 42 to again interrupt fluid pressure communication between the inlet and outlet ports 30 and 31, and further upward movement of the relay piston 63 disengages its valve seat 66 from the valve seal 40 to open the inlet valve exhaust passage 38 and re-establish communication between the outlet port 31 and the atmosphere to de-energize the wheel brake assemblies associated therewith by exhausting fluid pressure from brake chambers 8 through the service line 7 and said outlet port, the outlet chamber 28 and the inlet valve exhaust passage 27, and therefrom to atmosphere through the exhaust port 32 in the intermediate housing 20.

In the event of the failure of the branch 3 with a resultant loss of fluid pressure in the reservoir 10, the manually applied force on the reaction piston 70 is transmitted directly to the relay piston 63 through the engagement of the reaction piston extension 72 with the shoulder formed between the bore 68 and counterbore 69 of the relay piston to effect direct actuation of the inlet valve 35. In this manner, the reaction piston 70 is moved downwardly in response to the manually applied force thereon to actuate the inlet valve 54, as previously described; however, since it is assumed that the branch 3 has failed, the establishment of fluid pressure in said branch is obviated. Of course, the manually applied force is transmitted directly to the relay piston 63; therefore, further downward movement of the reaction piston 70 and relay piston 63 effects direct actuation of the inlet valve 35 to establish fluid pressure flow in the branch 2 and energize the wheel brake assemblies associated therewith, as previously described. The fluid pressure established in the outlet chamber 28 acts on the effective area of the relay piston to create a reaction force in opposition to the directly applied manual force thereby affording the operator a direct and accurate "feel" as to the extent of the brake application. It should be noted that the lost stroke is maintained at a minimum upon failure of the branch 3. In other words, the lost stroke represents only the movement of the reaction piston 70 after the inlet valve 35 is unseated and until the relay piston 63 unseats the inlet valve 35.

In the event of the failure of the branch 2 with the resultant loss of fluid pressure in the reservoir 4, the manually applied force on the reaction piston 70 actuates the inlet valve 54 to establish pressure fluid communication between the inlet and outlet ports 47 and 48 which actuates the brake chambers 13 to energize the wheel brake assemblies associated therewith, and the fluid pressure in the outlet chamber 45 is transmitted to the expansible chamber 77 through the passage 76 in the reaction piston valve stem 72, as previously described. The fluid pressure in the expansible chamber 77 serves to move the relay piston 63 to actuate the inlet valve 35; however, since it is assumed that the branch 2 has failed, the establishment of fluid pressure in said branch is, of course, obviated. Nevertheless, the fluid pressure established in the expansible chamber 77 acts on the effective area of the reaction piston 70 creating a reaction force which moves said reaction piston upwardly against the applied manual force to compress the metering spring 79, as previously described, and afford the operator an accurate and direct "feel" as to the extent of the braking application. Of course, lost motion is obviated upon failure of the branch 2 since the operator feels the reaction force as soon as the valve 54 is unseated.

Referring now to FIG. 3, a control valve 100 is shown having substantially the same component parts functioning in the system 1 in substantially the same manner as the previously described control valve 5 with the following exceptions.

The control valve 100 is provided with a valve seating member 101 slidably received in the intermediate housing bore 62 with upper and lower free end portions 102 and 103 extending into the intermediate housing recess 32 and the lower housing counterbore 46, respectively, and an O-ring seal 104 is carried on said valve seating member in sealing engagement with said intermediate housing bore. A return spring 105 of negligible compressive force is biased between the wall 44 in the counterbore 46 and the valve seating member 101 to normally urge said valve seating member into abutment with the lower end portion 23 of the intermediate housing 20. A valve seat 106 is provided on the lower free end portion 103 for sealing engagement with the valve seal 59 of the inlet valve 54, and an annular resilient seal or disc 107 is carried in the upper free end portion 102. A vertical passage 108 is provided in the valve seating member 101 having an upper end extending coaxially through the seal 107 in open pressure fluid communication with the intermediate housing recess 32 and a lower end intersected by cross passages 109 provided in the lower free end portion 103 in open pressure fluid communication with the counterbore 46.

The reaction piston 70 is provided with an extension or stem portion 110 which is slidable in the relay piston bore 68 and extends coaxially through the inlet valve exhaust opening 38 with a lower free end portion 111 terminating in the intermediate housing recess 32, said extension having an O-ring seal 112 in sealing engagement with said relay piston bore. A valve seat 113 is provided on the free end 111 of the extension 110 for sealing engagement with the seating member seal 107, and a passage 114 is provided in said extension having one end connecting with the expansible chamber 77 and the other end thereof extending coaxially through the valve seat 113 in open pressure fluid communication with the intermediate housing recess 32 and in axial alignment with the passage 108 in the seating member 101. While the extension seat 113 is shown normally in juxtaposition with the seating member seal 107, it is also contemplated that said extension seat can normally be positioned in sealing engagement with said seating member seal without affecting the operation of the control valve 100.

In operation, the applied force on the reaction piston 70 moves the extension seat 113 into sealing engagement with the seating member seal 107 interrupting pressure fluid communication between the outlet and expansible chambers 46 and 77 and the atmosphere and communicating said chambers through the seating member and extension passages 108, 109 and 114. Further downward movement of the reaction piston 70 moves the seating member 101 against the return spring 105 to sealably engage the seat 106 with the valve seal 59 closing the exhaust opening 57 and thereafter disengage the inlet valve 54 from the seat 61 on the wall 44 to establish pressure fluid communication between the inlet and outlet ports 47 and 48 to actuate the brake chambers 13 and slack adjusters 14 and energize the wheel brake assemblies associated therewith, as previously described. The fluid pressure established in the outlet chamber 46 passes through the seating member passage and cross passages 108 and 109 in the extension passage 114 into the expansible chamber 77, and the fluid pressure so established on said expansible chamber acts on the relay piston 63 to move said relay piston into actuating engagement with the inlet valve 35 to establish pressure fluid communication between the inlet and outlet ports 30 and 31 thereby actuating the brake chamber 8 and slack adjusters 9 and energizing the wheel brake assemblies associated therewith, as previously described.

When the desired braking effort is attained and the manually applied force is removed from the reaction piston 70, the fluid pressure in the expansible chamber 77 serves to move said reaction piston upwardly toward its original position and the return springs 60 and 105 move the inlet valve 54 and the seating member 101 upwardly to their original positions. Initially the upward movement sealably re-engages the valve seal 59 with the seat 61 to again interrupt pressure fluid communication between the inlet and outlet ports 47 and 48; and, further upward movement disengages the seating member seat 106 from the inlet valve 54 to re-establish communication between the outlet port 48 and the atmosphere through the exhaust opening 57 in said inlet valve and re-engages said seating member in abutment with the lower end wall 23 of the intermediate housing 20. At the same time, fluid pressure is also exhausted from the expansible chamber 77 through the extension passage 114 and the seating member passage and cross-passages 108 and 109. Upon exhaustion of the fluid pressure from the expansible chamber 77, the return springs 41 and 67 serve to move the inlet valve 35 and relay piston 63 upwardly to their original positions wherein pressure fluid communication between the inlet and outlet ports 30 and 31 is again interrupted and communication between said outlet port and the atmosphere is re-established through the inlet valve exhaust opening 38, as previously described. The action of the return spring 67 also serves to again abut the relay piston 63 with the reaction piston 70 to maintain said relay and reaction pistons in their original positions wherein the seat 113 on reaction piston extension 110 is disengaged from the seating member seal 107 to vent the expansible chamber 77 directly into the exhaust chamber 32 in the intermediate housing 20.

In the event of the failure of the branches 2 or 3 with the resultant loss of fluid pressure in the reservoirs 4 or 10, respectively, the reaction piston extension 110 drives the seating member 101 to actuate the inlet valve 54 and the relay piston 63 actuates the inlet valve 35 to effect pressure fluid flow in either the branch 2 or the branch 3, as previously described.

Referring now to FIG. 4, a control valve 200 is shown having substantially the same component parts functioning in the system 1 in substantially the same manner as the previously described control valve 100 with the following exceptions.

The control valve 200 is provided with a simplified unidirectional check valve 201 in the lower housing counterbore 45 which is normally biased into sealing engagement with the seat 61 on the wall 44 by one end of a return spring 202 to interrupt pressure fluid communication between the inlet and outlet ports 47 and 48. The other end of the return spring 202 is engaged with a plug or bore closure member 203 retained on the lower end of the counterbore 45 against displacement by the snap ring 50. An O-ring seal 204 is carried in the plug 203 in sealing engagement with the counterbore 45.

In operation, the component parts of the control valve 200 function in the same manner as those of the control valve 100 except that the outlet chamber 46 is vented to atmosphere only through the seating member passage and cross passages 108 and 109 and the unidirectional valve 201 is driven by the seating member 101 between closed and open positions, which, respectively, interrupts and establishes pressure fluid communication between the inlet and outlet ports 47 and 48.

From the foregoing, it is now apparent that a novel control valve meeting the objects set out hereinbefore is provided and that changes or modifications to the precise configurations, shapes or details of the constructions set forth in the disclosure by way of illustration may be made by those skilled in the art without departing from the spirit of the invention as defined by the claims which follow.

What I claim is:

1. In a fluid pressure system having a pair of fluid pressure sources and a pair of brake chambers, a control valve comprising a housing, a pair of application means reciprocally mounted within said housing for controlling the application of fluid pressure from the sources to the brake chambers, respectively, one of said application means extending through the other of said application means and defining therebetween an expansible chamber, said one application means being movable in response to an applied force thereon to effect the application of fluid pressure from one of said sources to one of said brake chambers, and passage means in said one application means connecting said expansible chamber in open pressure fluid communication with the fluid pressure applied to said one brake chamber, the other of said application means being movable in response to fluid pressure in said expansible chamber to effect the application of fluid pressure from the other of said sources to the other of said brake chambers.

2. In a fluid pressure system having a pair of fluid pressure sources and a pair of brake chambers, a control valve for controlling the application of fluid pressure from the sources to the brake chambers comprising a housing, means within said housing providing a pair of pressure fluid flow passages for connecting the sources with the brake chambers, a pair of valve means controlling said flow passages, a pair of valve control means in said housing for operative engagement with said valve means, one of said valve control means extending through the other of said valve control means and defining therebetween an expansible chamber, said one valve control means being movable in response to an applied force into engagement with one of said valve means to move said one valve means to a position establishing pressure fluid flow in one of said flow passages, and passage means in said one valve control means connecting said expansible chamber in pressure fluid communication with the pressure fluid flow in said one flow passage, the other of said valve control means being movable in response to fluid pressure in said expansible chamber into engagement with the other of said valve means to move said other valve means to a position establishing pressure fluid flow in the other of said flow passages.

3. In a fluid pressure system having a pair of fluid pressure sources and a pair of brake chambers, a control valve for controlling the application of fluid pressure from the sources to the brake chambers, respectively, comprising a housing, means within said housing providing a pair of pressure fluid flow passages for connecting the sources with the brake chambers, a pair of valve means controlling said flow passages and normally communicating the brake chambers with the atmosphere, a pair of valve control means in said housing for operative engagement with said valve means, one of said valve control means extending through the other of said valve control means and defining therebetween an expansible chamber, said one valve control means being movable in response to an applied force into engagement with one of said valve means to move said one valve means to a position interrupting communication between one of the brake chambers and the atmosphere and establishing pressure fluid flow in one of said flow passages, and passage means in said one valve control means connecting said expansible chamber in pressure fluid communication with the established pressure fluid flow in said one flow passage, the other of said valve control means being movable in response to fluid pressure in said expansible chamber into engagement with the other of said valve means to move said other valve means to a position interrupting communication between the other of the brake chambers and the atmosphere and establishing pressure fluid flow in the other of said flow passages.

4. In a fluid pressure system having a pair of fluid pressure sources and a pair of brake chambers, a control valve for controlling the application of fluid pressure from the sources to the brake chambers, respectively, comprising a housing, means within said housing providing a pair of pressure fluid passages for connecting the sources with the brake chambers, a pair of valve means normally urged to a closed position for controlling said flow passages and normally communicating the brake chambers with the atmosphere, a pair of telescopically arranged valve control means reciprocally mounted in said housing, extension means on one of said valve control means and extending through the other of said valve control means, said one valve control means being movable in response to an applied force to move said extension means into engagement with one of said valve means to interrupt communication between one of the brake chambers and the atmosphere and move said one valve means to an open position establishing pressure fluid flow in one of said flow passages, an expansible chamber defined between said valve control means, and passage means in said extension means for communicating said expansible chamber with the fluid pressure of the established pressure fluid flow in said one flow passage, the other of said valve control means being movable in response to fluid pressure in said expansible chamber into engagement with the other of said valve means to interrupt communication between the other of the brake chambers and the atmosphere and move said other valve means to an open position establishing pressure fluid flow in the other of said flow passages.

5. In a fluid pressure system having a pair of fluid pressure sources and a pair of brake chambers, a control valve for controlling the application of fluid pressure from the sources to the brake chambers, respectively, comprising a housing, means within said housing providing a pair of pressure fluid flow passages for connecting the sources with the brake chambers, a pair of valve members normally biased to a closed position interrupting pressure fluid flow through said flow passages, an exhaust opening in each of said valve means normally venting the brake chambers to the atmosphere, valve control means slidable in said housing and having a first valve seat thereon for operative engagement with one of said valve means, operator controlled means slidable in said housing, an expansible chamber in said housing between said valve control means and operator controlled means, extension means on said operator controlled means extending coaxially through said first valve seat in said valve control means and having a second valve seat thereon for operative engagement with the other of said valve means, said operator controlled means being movable to move said second valve seat into sealing engagement with said other valve means to close the exhaust opening therein and then move said other valve means to an open position to establish pressure fluid flow through one of said flow passages, and a passage in said extension means connecting said expansible chamber in open pressure fluid communication with the fluid pressure of the established pressure fluid flow in said one flow passage, said valve control means being movable in response to fluid pressure in said expansible chamber to move said first valve seat into sealing engagement with said movable valve means closing the exhaust opening therein and then move said one valve means to an open position to establish pressure fluid flow through the other of said flow passages.

6. A control valve for controlling the application of fluid pressure from a pair of fluid pressure sources to a pair of brake chambers, respectively, comprising a housing, means in said housing providing a pair of pressure fluid flow passages therethrough, each of said flow passages including an inlet and outlet chamber, a pair of valve seats in said flow passages between the inlet and outlet chambers thereof, a pair of inlet valves normally urged into sealing engagement with said valve seats, an exhaust opening in each of said inlet valves normally venting said outlet chambers to atmosphere, a pair of independently movable piston means in one of said outlet chambers, an expansible chamber between said piston means, one of said piston means being adapted for operative engagement with one of said inlet valves, extension means on the other of said piston means having a free end in the other of said outlet chambers for operative engagement with the other of said inlet valves, said other piston means being movable in response to an applied force to sealably engage the free end of said extension with said other inlet valve closing the exhaust opening therein to interrupt the communication between said other outlet chamber and the atmosphere and thereafter disengage said other inlet valve from its valve seat to establish pressure fluid communication between said other outlet chamber and the inlet chamber connected therewith, a passage in said extension means connecting said expansible chamber in open pressure fluid communication with said other outlet chamber, said one piston means being movable in response to fluid pressure in said expansible chamber into sealing engagement with said one inlet valve closing the exhaust opening therein to interrupt communication between said one outlet chamber and the atmosphere and thereafter disengage said one inlet valve from its valve seat to establish pressure fluid communication between said one outlet chamber and the inlet chamber connected therewith.

7. In a fluid pressure system having a pair of fluid pressure sources and a pair of brake chambers, a control valve for controlling the application of fluid pressure from the sources to the brake chambers, respectively, comprising a housing, means within said housing providing a pair of fluid pressure flow passages for connecting the sources with the brake chambers, a pair of valve means controlling said flow passages, a pair of valve control means, an expansible chamber between said valve control means, a seating member slidable in said housing and adapted for operative engagement with one of said valve means, passage means in said seating member normally communicating one of the brake chambers with the atmosphere, an exhaust opening in the other of said valve means normally communicating the other of the brake chambers with the atmosphere, extension means on one of said valve control means and extending through the other of said valve control means for operative engagement with said seating member, the passage means in said seating member being closed to atmosphere upon movement of said extension means thereagainst in response to an applied force on said one valve control means and said seating member being thereafter moved into engagement with said one valve means to move said one valve means to a position establishing open pressure fluid communication through one of said flow passages, and a connecting passage in said extension means normally communicating said expansible chamber with the atmosphere and adapted for open pressure fluid communication with said passage means upon engagement of said extension means and seating member to pass the fluid pressure of the established pressure fluid flow in said one flow passage into said expansible chamber, said other valve control means being movable in response to fluid pressure in said expansible chamber into engagement with said other valve means to close the exhaust opening therein and thereafter move said other valve means to a position establishing pressure fluid flow through the other of said flow passages.

8. In a fluid pressure system having a pair of fluid pressure sources and a pair of brake chambers, a control valve for controlling the application of fluid pressure from the sources to the brake chambers, respectively, comprising a housing, means within said housing providing a pair of pressure fluid flow passages for connecting the sources with the brake chambers, a pair of normally closed valve means for controlling said flow passages, a seating member slidable in said housing and adapted for operative engagement with one one of said valve means, an exhaust passage in said seating member normally communicating one of said brake chambers with the atmosphere, a valve seat on said sealing member circumferentially disposed about one end of said exhaust passage, valve control means slidable in said housing and adapted for operative engagement with the other of said valve means, operator controlled means slidable in said housing, extension means on said operator controlled means and extending through said valve control means, a free end on said extension means for sealing engagement with said valve seat, an expansible chamber formed in said housing between said operator controlled means and said valve control means, said extension means being movable in response to an applied force on said operator controlled means to sealably engage the free end thereof with said valve seat to close said exhaust passage and thereafter move said seating member into engagement with said one valve means to open said one valve means and establish fluid pressure flow through one of said flow passages to said one brake chamber, and a connecting passage in said extension means having one end connected with said expansible chamber and the other end thereof extending through the free end of said extension means to normally communicate said expansible chamber with the atmosphere, said connecting passage being closed to the atmosphere and being connected in open pressure fluid communication with said exhaust passage in said seating member upon the sealing engagement of the free end of said extension means with said valve seat on said sealing member to pass the fluid pressure of the established fluid pressure flow in said one flow passage into said expansible chamber, and said valve control means being movable in response to fluid pressure in said expansible chamber into engagement with said other valve means to close the exhaust opening therein and thereafter open said other valve means to establish fluid pressure flow through the other of said flow passages to the other of said brake chambers.

9. A control valve for pressure fluid comprising a housing having a pair of sets of ports therein, each port set including inlet, outlet and exhaust ports, a pair of valve means controlling pressure fluid communication between the ports of said port sets, respectively, a pair of valve control means in said housing for operative engagement with said valve means, one of said valve control means extending through the other of said valve control means and defining therebetween an expansible chamber, said one valve control means being movable in response to an applied force into engagement with one of said valve means to move said one valve means to a position interrupting pressure fluid communication between the outlet and exhaust ports and establishing pressure fluid communication between the inlet and outlet ports of one of said port sets, and passage means in said one valve control means connecting the fluid pressure at the outlet port of said one port set with said chamber, said other valve control means being movable in response to fluid pressure in said chamber into engagement with the other of said valve means to move said other valve means to a position interrupting pressure fluid communication between the outlet and exhaust ports and establishing pressure fluid communication between the inlet and outlet ports of the other of said port sets.

10. A control valve for pressure fluid comprising a housing having a pair of sets of ports therein, each port set including inlet, outlet and exhaust ports, a pair of valve means controlling pressure fluid communication between the ports of said port sets, respectively, a pair of valve control means slidable in said housing, one of said valve control means having extension means thereon extending through the other of said valve control means, said extension means having a free end thereon for operative engagement with one of said valve means, the free end being movable into engagement with said one valve means in response to an applied force on said one valve control means to move said one valve means to a position interrupting pressure fluid communication between the outlet and exhaust ports and establishing pressure fluid communication between the inlet and outlet ports of one of said port sets, an expansible chamber in said housing between said valve control means, and passage means in said extension means connecting the established fluid pressure at the outlet port of said one port set with said chamber, said other valve control means being movable in response to fluid pressure in said chamber into engagement with the other of said valve means to move said other valve means to a position interrupting pressure fluid communication between the outlet and exhaust ports and establishing pressure fluid communication between the inlet and outlet ports of the other of said port sets.

11. A control valve for pressure fluid comprising a housing having a pair of sets of ports therein, each port set including inlet, outlet and exhaust ports, a pair of valve means normally interrupting pressure fluid communication between the inlet and outlet ports and establishing pressure fluid communication between the outlet and exhaust ports of said port sets, respectively, valve control means for operative engagement with one of said valve means, operator controlled means within said housing including extension means slidably received in said valve control means and extending therethrough for operative engagement with the other of said valve means, an expansible chamber in said housing between said operator controlled means and valve control means, said operator controlled means being movable in response to an applied force thereon to engage said extension means with said other valve means and move said other valve means to a position interrupting pressure fluid communication between the outlet and exhaust ports and establishing pressure fluid communication between the inlet and outlet ports of one of said port sets, and passage means in said extension means connecting said chamber in open pressure fluid communication with the outlet port of said one port set to provide passage of the established fluid pressure at the outlet port of said one port set into said chamber, said valve control means being movable in response to fluid pressure in said chamber into engagement with said one valve means to move said one valve means to a position interrupting pressure fluid communication between the outlet and exhaust ports and establishing pressure fluid communication between the inlet and outlet ports of the other of said port sets.

12. A control valve for fluid pressure comprising a housing, a pair of sets of ports in said housing, each port set including inlet, outlet and exhaust ports, a pair of valve means normally urged to a closed position to interrupt pressure fluid communication between the inlet and outlet ports of said port sets, respectively, an exhaust opening in each of said valve means normally venting the outlet ports of said port sets to the atmosphere, respectively, valve control means slidable in said housing and having a first valve seat thereon for operative engagement with one of said valve means, operator controlled means slidable in said housing, extension means on said operator controlled means, said extension means being slidably received in said valve control means and extending coaxially through said first valve seat, a free end on said extension means having a second valve seat thereon for operative engagement with the other of said valve means, the exhaust opening in said other valve means being closed by movement of said second seat thereagainst in response to an applied force on said operator controlled means and said other valve means being thereafter moved to an open position to establish pressure fluid communication between the inlet and outlet ports of one of said port sets, an expansible chamber formed in said housing between said operator controlled means and said valve control means, and a passage in said extension means having one end connected with said chamber and the other end thereof in open pressure fluid communication with the fluid pressure established at the outlet port of said one port set, the exhaust opening in said one valve means being closed by movement of said first valve seat thereagainst in response to fluid pressure in said chamber acting on said valve control means and said one valve means being thereafter moved to an open position to establish pressure fluid communication between the inlet and outlet ports of the other of said port sets.

13. A control valve for fluid pressure comprising a housing having first inlet and outlet chambers and second inlet and outlet chambers, first and second valve seats in said first and second inlet chambers, first and second connecting passages extending through said first and second valve seats and interconnecting said first and second inlet and outlet chambers, respectively, first and second valve elements normally urged into sealing engagement with said first and second valve seats to interrupt pressure fluid communication between said first and second inlet and outlet chambers, respectively, first and second exhaust openings in said first and second valve elements normally communicating said first and second outlet chambers to atmosphere, first and second piston means slidable in said first outlet chamber, an expansible chamber formed in said first outlet chamber between said first and second piston means, a third valve seat on said first piston means for operative engagement with said first valve element, an extension on said second piston means and slidably received in said first piston means, said extension extending coaxially through said third valve seat and having a free end in said second outlet chamber, a fourth valve seat on the free end of said extension adapted for operative engagement with said second valve element, said second piston means being initially movable in response to an applied force thereon to move said fourth valve seat into sealing engagement with said second valve element to close said second exhaust opening and being further movable to disengage said second valve element from said second valve seat to open said second connecting passage and establish pressure fluid communication between said second inlet and outlet chambers, and a passage in said extension having one end connected in open pressure fluid communication with said expansible chamber and the other end thereof connected in open pressure fluid communication with said second outlet chamber, said first piston means being initially movable in response to pressure fluid in said expansible chamber to move said third valve seat into sealing engagement with said first valve element to close said first exhaust opening and being further movable to disengage said first valve element from said first valve seat to open said first connecting passage and establish pressure fluid communication between said first inlet and outlet chambers.

14. A control valve for fluid pressure comprising a housing having first and second pairs of bores therein in axial alignment, means connected in said housing providing a separation plate to separate said first bore pair from said second bore pair, first and second radially extending walls between the bores of said first and second bore pairs, respectively, first and second valve seats on said first and second walls and in axial alignment, first and second connecting passages coaxially extending through said first and second valve seats and connecting between the bores of said first and second bore pairs, first and second inlet ports connecting with one bore of said first and second bore pairs, respectively, first and second outlet ports connected with the other bore of said first and second bore pairs, respectively, first and second valve means normally urged into sealing engagement with said first and second valve seats to close said first and second connecting passages and interrupt pressure fluid communication between said first and second inlet and outlet ports, first and second exhaust openings in said first and second valve means normally venting said first and second outlet ports to the atmosphere, a centrally located bore in said separation plate and coaxial with said first and second connecting passages, first and second piston means slidable in the other bore of said first bore pair, an expansible chamber formed in the other bore of said first first bore pair between said first and second piston means, first and second extensions on said first and second piston means for operative engagement with said first and second valve means, said second extension being slidably received in said first piston means and extension and said separation plate bore and extending coaxially through said first exhaust opening in said first valve means into the other bore of said second bore pair, said second piston means being movable in response to an applied force thereon to move said second extension through said second connecting passage into sealing engagement with said second valve means closing said second exhaust opening and then disengaging said second valve means from said second valve seat to open said second connecting passage and establish pressure fluid communication between said second inlet and outlet ports, and other passage means in said second extension and connecting between said expansible chamber and the other bore of said second bore pair for passing the established fluid pressure at said second outlet port into said expansible chamber, said first piston means being movable in response to the fluid pressure in said expansible chamber to move said first extension means through said first connecting passage into sealing engagement with said first valve means closing said first exhaust opening and then disengaging said first valve means from said first valve seat to open said first connecting passage and establish pressure fluid communication between said first inlet and outlet ports.

15. A control valve for fluid pressure comprising a housing, means within said housing providing a pair of pressure fluid flow passages therethrough, each of said flow passages including an interconnected inlet and outlet chamber, a pair of valve means in said flow passages controlling pressure fluid communication between said inlet and outlet chambers and the atmosphere, a pair of valve control means slidable in one of said outlet chambers for operative engagement with said valve means, one of said valve control means being movable in response to an applied force into engagement with one of said valve means to move said one valve means to a position interrupting pressure fluid communication between the other of said outlet chambers and the atmosphere and establishing pressure fluid communication between said other outlet chamber and the inlet chamber connected therewith, an expansible chamber between said valve control means, and passage means in said one valve control means connecting said expansible chamber in open pressure fluid communication with said other outlet chamber, the other of said valve control means being movable in response to fluid pressure in said expansible chamber into engagement with the other of said valve means to move said other valve means to a position interrupting pressure fluid communication between said one outlet chamber and the atmosphere and establishing pressure fluid communication between said one outlet chamber and the inlet chamber connected therewith.

16. A control valve for fluid pressure comprising a housing having a pair of pressure fluid flow passages therethrough, each of said flow passages including an interconnected inlet and outlet chamber, a pair of valve seats in said flow passages between the inlet and outlet chambers thereof, a pair of valve means normally urged into engagement with said valve seats interrupting pressure fluid communication between said inlet and outlet chambers and establishing pressure fluid communication between said outlet chambers and the atmosphere, a pair of valve control means in one of said outlet chambers for operative engagement with said valve means, one of said valve control means being movable in response to an applied force into engagement with one of said valve means to move said one valve means to a position interrupting pressure fluid communication between the other of said outlet chambers and the atmosphere and establishing pressure fluid communication between said other outlet chamber and the inlet chamber connected therewith, said valve control means having opposed fluid pressure responsive surfaces defining with said housing an expansible chamber therebetween, and means in said one valve control means providing passage of fluid pressure between said other outlet chamber and expansible chamber, the other of said valve control means being movable in response to fluid pressure in said expansible chamber acting on the fluid pressure responsive surface thereof into engagement with the other of said valve means to move said other valve means to a position interrupting pressure fluid communication between said one outlet chamber and the atmosphere and establishing pressure fluid communication between said one outlet chamber and the inlet chamber connected therewith.

17. A control valve for fluid pressure comprising a housing, means within said housing providing a pair of pressure fluid flow passages therethrough, each of said flow passages including an interconnected inlet and outlet chamber, a pair of valve means in said flow passages controlling pressure fluid communication between said inlet and outlet chambers and the atmosphere, a pair of valve control means in one of said outlet chambers, extension means on one of said valve control means and extending through the other of said valve control means into the other of said outlet chambers, free end portions on said extension means and said other valve control means for engagement with said valve means, said one valve control means and said extension means being movable in response to an applied force to engage the free end portion of said extension means with one of said valve means and then move said one valve means to a position interrupting pressure fluid communication between said other outlet chamber and the atmosphere and establishing pressure fluid communication between said other outlet chamber and the inlet chamber connected therewith, an expansible chamber defined in said housing between said valve control means, and passage means in said extension means connecting said other outlet chamber in open pressure fluid communication with said expansible chamber, said other valve control means being movable in response to fluid pressure in said expansible chamber to engage the free end portion thereof with the other of said valve means and then move said other valve means to a position interrupting pressure fluid communication between said one outlet chamber and the atmosphere and establishing pressure fluid communication between said one outlet chamber and the inlet chamber connected therewith.

18. A control valve for fluid pressure comprising a housing having a pair of sets of ports therein, each port set including an inlet and outlet port, an exhaust chamber in said housing between said port sets, first valve means controlling pressure fluid communication between the ports of one of said port sets and said exhaust chamber, second valve means controlling pressure fluid communication between the ports of the other of said port sets, third valve means including first passage means normally establishing pressure fluid communication between the outlet port of said other port set and said exhaust chamber, a pair of valve control means slidable in said housing, an expansible chamber between said valve control means, second passage means in one of said valve control means normally establishing pressure fluid communication between said expansible and exhaust chambers, said one valve control means being initially movable in response to an applied force into engagement with said third valve means to interconnect said first and second passage means to establish open pressure fluid communication between said expansible chamber and the outlet port of said other port set and interrupt pressure fluid communication between said exhaust chamber and said expansible chamber and outlet port of said other port set, said one valve control means being subsequently movable to engage said third valve means with said second valve means and move said second valve means to a position establishing pressure fluid communication between the ports of said other port set, and said other valve control means being movable in response to fluid pressure in said expansible chamber into engagement with said first valve means to move said first valve means to a position interrupting pressure fluid communication between the outlet port of said one port set and said exhaust chamber and establishing pressure fluid communication between the ports of said one port set.

19. A control valve for fluid pressure comprising a housing having a pair of port sets, each port set including inlet and outlet ports, a pair of valve means controlling pressure fluid communication between said ports, a resiliently urged seating member slidable in said housing and spaced from one of said valve means, first and second passage means in the other of said valve means and said seating member normally venting the outlet ports of said port sets to atmosphere, respectively, a pair of control means slidable in said housing, an expansible chamber between said control means, a valve seat on said seating member in circumscribing relation with said second passage means, extension means on one of said control means extending through the other of said control means and having a free end thereon for engagement with said valve seat, third passage means in said extension means having one end connected with said expansible chamber and the other end thereof extending through said free end to normally vent said chamber to atmosphere, said one control means and extension means being initially movable in response to an applied force to engage said free end with said valve seat interrupting pressure fluid communication between said expansible chamber and the outlet port of said one of said port sets with the atmosphere and interconnecting said second and third passage means to establish pressure fluid communication between said expansible chamber and the outlet port of said one port set, said one control means and extension means being subsequently movable to move said seating member into engagement with said one valve means to move said one valve means to a position establishing pressure fluid communication between the ports of said one port set, and said other valve control means being movable in response to fluid pressure in said expansible chamber into engagement with said other valve means to close said first passage means and then move said other valve means to a position establishing pressure fluid communication between the ports of the other of said port sets.

20. In a fluid pressure system having a pair of fluid pressure sources and a pair of fluid pressure responsive motors, a control valve including a housing having a pair of chamber portions, each of said chamber portions having a pressure fluid flow passage therein respectively connecting said sources with said motors, a pair of telescopically arranged application means reciprocally mounted in one of said chamber portions for controlling the application of fluid pressure through said flow passages between said sources and motors, one of said application means being movable in response to an applied force to effect the application of fluid pressure through the flow passage in the other of said chamber portions, said application means defining in said one chamber portion an expansible chamber therebetween, and means in said one application means providing passage for the applied fluid pressure between the flow passage in the other of said housing chamber portions and said expansible chamber, said other application means being movable in response to fluid pressure in said expansible chamber to effect the application of fluid pressure through the flow passage in said one housing chamber portion.

21. In a fluid pressure system having a pair of fluid pressure sources and a pair of fluid pressure responsive motors, a control valve for controlling the application of fluid pressure from said sources to said motors including a housing having a pair of spaced chamber portions, each of said chamber portions having a pressure fluid flow passage therein respectively connecting said sources with said motors, a pair of valve means controlling said flow passages, a pair of telescopically arranged valve control means reciprocally mounted in one of said housing chamber portions for operative engagement with said valve means, said valve control means defining in said one housing chamber portion an expansible chamber therebetween, one of said valve control means being movable in response to an applied force into engagement with one of said valve means to move said one valve means to a position establishing pressure fluid flow through the flow passage of the other of said housing chamber portions, and passage means in said one valve control means connecting said expansible chamber in pressure fluid communication with the pressure fluid flow established in the flow passage of said other housing chamber portion, said other valve control means being movable in response to fluid pressure in said expansible chamber into engagement with the other of said valve means to move said other valve means to a position establishing pressure fluid flow through the flow passage in said one housing chamber portion.

22. In a fluid pressure system having a pair of fluid pressure sources and a pair of fluid pressure responsive motors, a control valve including a housing having a pair of portions therein defining separate pressure fluid flow passages connected between said sources and motors, respectively, first and second application means in one of said housing portions, said first application means controlling the application of fluid pressure through the flow passage in said one housing portion, said second application means being slidably received in said first application means and extending therethrough into the other of said housing portions to control the application of fluid pressure through the flow passage in said other housing portion, said first and second application means defining an expansible chamber therebetween in said one housing portion, said second application means being movable in response to an applied force to effect the application of fluid pressure through the flow passage in said other housing portion, and passage means in said second application means connecting said chamber in pressure fluid communication with the flow passage in said other housing portion, said first application means being movable in response to fluid pressure in said chamber to effect the application of fluid pressure through the flow passage in said one housing portion.

23. In a fluid pressure system having a pair of fluid pressure sources and a pair of fluid pressure responsive motors, a control valve for controlling the application of fluid pressure from said sources to said motors including a housing having a pair of portions therein defining separate pressure fluid flow passages for respectively connecting said sources with said motors, a pair of valve means normally urged to a position closing said flow passages and interrupting pressure fluid flow between said sources and motors, an exhaust passage in each of said valve means normally venting said motor to the atmosphere, a pair of valve control means in one of said housing portions for operative engagement with said valve means, said valve control means defining in said one housing portion an expansible chamber therebetween, one of said valve control means being slidably received in the other of said valve control means and extending therethrough into the other of said housing portions, said one valve control means being initially movable in response to an applied force into engagement with one of said valve means to close the exhaust passage therein and thereafter move said one valve means to a position establishing pressure fluid flow through the flow passage of said other housing portion, and means in said one valve control means providing passage for the established pressure fluid flow through the flow passage of said other housing portion into said chamber, said other valve control means being initially movable in response to the fluid pressure of the established pressure fluid flow in said chamber into engagement with the other of said valve means to close the exhaust passage therein and thereafter move said other valve means to a position establishing pressure fluid flow through the flow passage of said one housing portion.

24. In a fluid pressure system having a pair of fluid pressure sources and a pair of fluid pressure responsive motors, a control valve including a housing, a pair of application means adapted for concert and independent movement within said housing for controlling the application of fluid pressure from said sources to said motors, respectively, one of said application means extending through the other of said application means and defining therebetween an expansible chamber, said one application means being movable in response to an applied force thereon to effect the application of fluid pressure from one of said sources to one of said motors and to concertly move said other application means to an advanced position, and means in said one application means providing passage for the fluid pressure applied to said one motor into said chamber, said other application means being subsequently movable from the advanced position independently of said one application means in response to fluid pressure in said chamber to effect the application of fluid pressure from the other of said sources to the other of said chambers in a time sequence substantially simultaneous with that applied to said one motor.

25. In a fluid pressure system having a pair of fluid pressure sources and a pair of fluid pressure responsive motors, a control valve for controlling the application of fluid pressure from said sources to said motors including a housing, means within said housing providing a pair of pressure fluid flow passages connected between said sources and motors, a pair of valve means controlling said flow passages, a pair of valve control means adapted for concert and independent movement in said housing and predeterminately spaced from said valve means, one of said valve control means extending through the other of said valve control means and defining therebetween an expansible chamber, said one valve control means being movable in response to an applied force thereon into engagement with one of said valve means to move said one valve means to a position establishing pressure fluid flow in one of said flow passages, and passage means in said one valve control means connecting said chamber in pressure fluid communication with said one flow passage, said other valve control means being initially concertly movable with said one valve control means to an advanced position juxtaposed with the other of said valve means and being thereafter movable from the advanced position independently of said one valve control means in response to fluid pressure in said chamber to engage and move said other valve means to a position establishing pressure fluid flow in the other of said flow passages in a time sequence substantially concurrent with the establishment of pressure fluid flow in said one flow passage.

26. In a fluid pressure system having a pair of fluid pressure sources and a pair of fluid pressure responsive motors, means for controlling the application of fluid pressure from said sources to said motors including a housing, means within said housing providing a pair of pressure fluid flow passages respectively connected between said sources and motors, a pair of valve means controlling said flow passages, a pair of valve control means in said housing and normally engaged for concert movement, extension means on one of said valve control means and extending through the other of said valve control means, a valve seat on said extension means for operative engagement with one of said valve means and normally spaced therefrom a predetermined distance, another valve seat on said other valve control means for operative engagement with the other of said valve means, said other valve seat being normally predeterminately spaced from said other valve means a distance greater than that between said first named valve seat and said one valve means, said one valve control means and extension means being movable in response to an applied force to engage said first named valve seat with said one valve means and move said one valve means to a position establishing pressure fluid flow through one of said flow passages between one of said sources and one of said motors, said other valve control means being initially movable in concert with said one valve control means to move said other valve seat to an advanced position closer to said other valve means than the predetermined distance therebetween, an expansible chamber defined in said housing between said valve control means, and passage means in said extension means connecting said chamber in pressure fluid communication with said one flow passage, said other valve control means being further movable independently of said one valve control means in response to fluid pressure in said chamber to move said other valve seat from the advanced position into engagement with said other valve means and move said other valve means to a position establishing pressure fluid flow through the other of said flow passages between the other of said sources and motors in a time sequence substantially simultaneously with the establishment of pressure fluid flow in said one flow passage.

References Cited in the file of this patent

FOREIGN PATENTS

| | | |
|---|---|---|
| 92,118 | Holland | Sept. 15, 1959 |
| 798,816 | Great Britain | July 30, 1958 |